United States Patent [19]
Downie et al.

[11] Patent Number: 6,097,029
[45] Date of Patent: Aug. 1, 2000

[54] APPARATUS FOR POSITIONING A CAMERA IN AN OBJECT RECOGNITION SYSTEM

[76] Inventors: James Downie, 21231 Cythera, Mission Viejo, Calif. 92692; Ulrike Helene Rinehart, 1521 Squires Dr., Santa Ana, Calif. 92705; Julian Garrard Blackburn, 1560 Coolcrest Ave., Upland, Calif. 91786; Eddie Louis Madison, 26072 Ramjit Ct., Lake Forest, Calif. 92630; Alan Thomas Theis, 21296 Tupelo, Lake Forest, Calif. 92630; George Moffat, 22762 Foxborough Way, Lake Forest, Calif. 92630; Craig Weaver Harris, 25596 Loganberry La., Lake Forest, Calif. 92630

[21] Appl. No.: 09/057,379

[22] Filed: Apr. 8, 1998

[51] Int. Cl.⁷ ...................................................... G06K 9/24
[52] U.S. Cl. ............................ 250/330; 250/332; 250/334
[58] Field of Search ..................................... 250/330, 332, 250/334

[56] References Cited

U.S. PATENT DOCUMENTS

| | | | |
|---|---|---|---|
| 5,299,971 | 4/1994 | Hart | 446/484 |
| 5,768,647 | 6/1998 | Coffin et al. | 396/428 |
| 5,991,429 | 11/1999 | Coffin et al. | 382/118 |
| 6,023,061 | 2/2000 | Bodkin | 250/332 |

*Primary Examiner*—Constantine Hannaher
*Assistant Examiner*—Otilia Gabor
*Attorney, Agent, or Firm*—Charles J. Fassbender; Mark T. Starr; Steven B. Samuels

[57] ABSTRACT

A system for recognizing objects is comprised of: 1) a camera that has a lens which is uncovered; 2) a housing which encloses the camera, and has a window for the lens; 3) a rotating means, which is inside of the housing and which carries the camera, for receiving electronic control signals and rotating the camera at different angles in response thereto; and, 4) a control means for generating the electronic control signals such that the rotating means selectively points the camera lens -a) through the window at any one of several predetermined angles, and b) inside of the housing at the surface for calibrating the camera. With this system, the objects that are recognized can be human faces at different heights relative to the window in the housing. By pointing the camera lens inside of the housing, the lens is protected from damage even though it is not covered; and a calibration surface inside of the housing enables the camera to be calibrated while the lens is protected.

14 Claims, 6 Drawing Sheets

APPARATUS FOR POSITIONING A CAMERA IN AN OBJECT RECOGNITION SYSTEM

BACKGROUND OF THE INVENTION

This invention relates to object recognition systems; and more particularly, it relates to apparatus for positioning a camera within an object recognition system.

One particular use for the present invention occurs in object recognition systems which either grant or deny a person access to a secure area based on whether or not an image from a camera of the person's face is recognized by the system. Also, the present invention can be used in object recognition systems which employ a robotic arm to select or reject a component based on whether or not an image from a camera of the component is recognized by the system.

In all of the above applications, a key task which needs to be performed as part of the recognition process is that two images must be correlated. One of these images is the image from a camera of an unknown object which the system is trying to recognize, and the other image is of a known object which is stored in the system as a reference. If the correlation between the two images exceeds a predetermined threshold value, then the unknown object is recognized.

However before the two images are correlated, it is desirable to position the camera in the object recognition system such that it is closely aligned with the unknown object. Otherwise, if the camera is misaligned, a pixel-by-pixel correlation of the image from the camera and the stored image will be degraded, and that will cause recognition errors.

Also, in the above applications, another task which is desirable to perform is to somehow protect the camera lens from damage. This protection can be achieved by covering the external surface of the lens with a shutter; however, the addition of such a shutter increases the cost of the object recognition system.

Further in the above applications, it often is necessary to provide a means for calibrating the camera. For example, an infrared camera has hundreds of individual pixel sensors which must be periodically calibrated in order for them to generate the same pixel values for an object of uniform temperature. This calibrating means can be provided by a mechanism which periodically moves a planar surface of uniform temperature in front of the lens. However, the addition of such a mechanism will further increase the cost of the object recognition system.

Accordingly, a primary object of the present invention is to provide an object recognition system with a novel camera positioning apparatus which performs all of the above tasks.

BRIEF SUMMARY OF THE INVENTION

One embodiment of the present invention is comprised of the following components: 1) an infrared camera that has a lens which is uncovered; 2) a housing which encloses the camera, has a window for the lens, and has an internal surface for calibrating the camera; 3) a rotating means, which is inside of the housing and which carries the camera, for receiving electronic control signals and rotating the camera at different angles in response thereto; and, 4) a control means for generating the electronic control signals such that the rotating means selectively points the camera lens -a) through the window at any one of several predetermined angles, and b) inside of the housing at the surface for calibrating the camera.

With this embodiment, human faces can be recognized which are at different heights relative to the window in the housing. To obtain access to a secure area, each person X enters a personal identification number into the object recognition system. In response, the control means reads a corresponding camera angle θ(X) for that person X which is stored within the control means, and the rotating means points the camera lens through the housing window at the angle θ(X).

Also with this embodiment, the selective pointing of the camera lens inside of the housing accomplishes two tasks. First, the lens is protected from damage even though it is not covered; and second, the calibration surface inside of the housing enables the camera to be calibrated while the lens is protected. Preferably, the rotating means completely blocks the window in the housing when the camera is pointed inside of the housing, as this protects the lens from damage and also protects the entire camera from theft.

Figure 1:
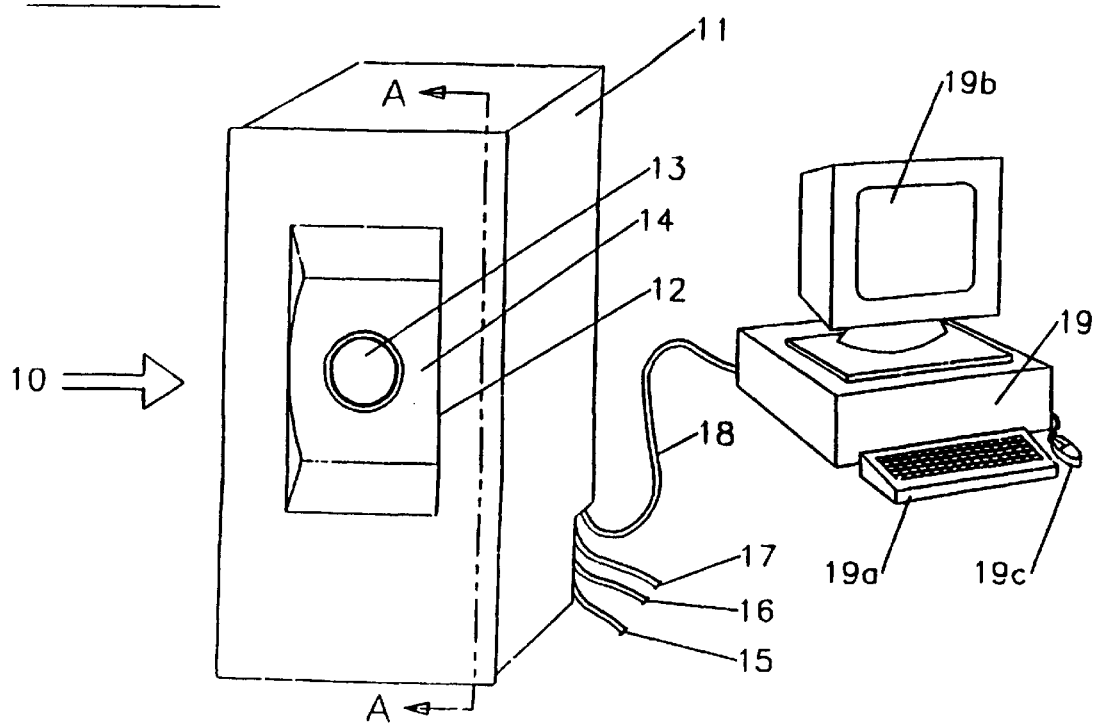
FIG. 1 shows a three-dimensional external view of an object recognition system which constitutes one preferred embodiment of the present invention.

DETAILED DESCRIPTION:

Referring now to FIG. 1, the details of an object recognition system which constitutes one preferred embodiment of the present invention will be described. A key part of this FIG. 1 system is an electromechanical apparatus 10; and it includes a housing 11 which has a front face with a window 12. Inside of the housing 11 is an infrared camera 13 and a carrier 14 for the camera. Only the lens of the camera 13 and a small portion of the carrier 14 can be seen through the window 12; but the camera and the carrier are shown in greater detail in FIGS. 4 and 5.

Extending from the back of the housing 11 are four electrical cables 15, 16, 17 and 18. Cable 15 is a power cable which supplies electrical power to the apparatus 10. Cable 16 is a card reader cable on which the apparatus 10 receives electrical signals that represent the personal identification number of a person who is seeking access to a secure area. Cable 17 is a door lock cable on which the apparatus 10 sends electrical signals which open a door to the secure area. Cable 18 provides a communication channel which interconnects the apparatus 10 to an enrollment terminal 19.

Figure 2:
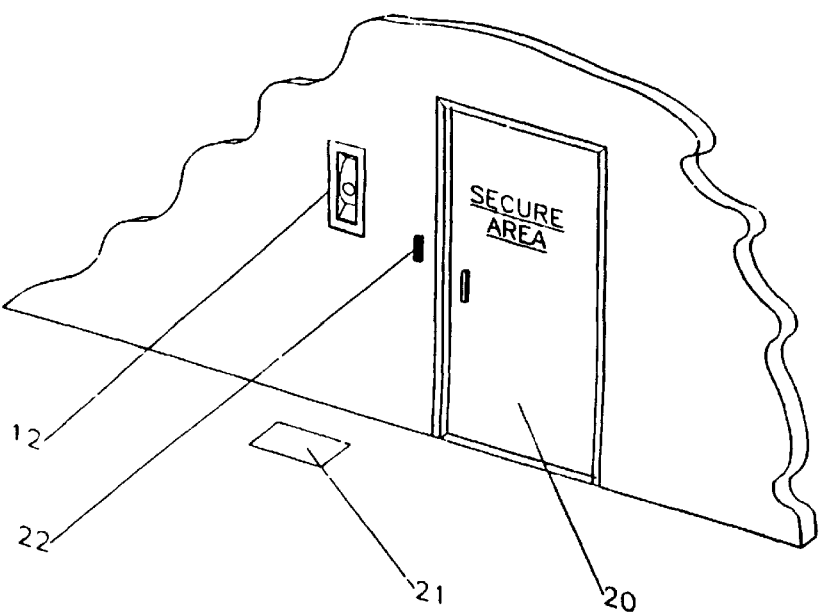
FIG. 2 shows an example of how the object recognition system of FIG. 1 is used to either grant or deny a person access to a secure area.

An example of how the FIG. 1 object recognition system is used is shown in FIG. 2. There, reference numeral 20 identifies the door to the secure area. In order to be granted access to the secure area, a person X must first be enrolled in the object recognition system. During this enrollment, the person X stands on a spot 21 and looks at the window 12 of the apparatus 10 while an operator of the enrollment terminal 19 manually enters commands via the keyboard 19a.

Initially by these commands, the carrier 14 is rotated to an angle θ(X) which the operator selects as the angle where the lens of the camera 13 is pointing directly at the face of the person X. Then the operator enters another command which stores, within the apparatus 10, an infrared image of the face of the person X from the camera 13, along with his personal identification number and the angle θ(X). This enrollment process is repeated for each person X who is to be granted access to the secure area.

At any time after a person x is enrolled, that person can obtain access to the secure area by standing on the spot 21, looking at the window 12, and passing a magnetic stripe on a card which stores his personal identification number through a card reader 22. This causes the personal identification number of the person X to be sent on the cable 16 to the apparatus 10. If the personal identification number which is received by the apparatus 10 on the cable 16 matches one of the personal identification numbers which were previously stored in the apparatus 10 during the enrollment process, then the apparatus 10 automatically rotates the camera 13 on the carrier 14 to the angle θ(X) which corresponds to the personal identification number. While the camera is pointing at the angle θ(X), the apparatus 10 correlates an image from the camera 13 of the person who is seeking access with the image of the person X which was stored during the enrollment process. If that correlation exceeds a predetermined threshold, then the apparatus 10 sends electrical signals on the cable 17 which unlock the door 20 to the secure area.

One particular feature of the apparatus 10 is that it provides a means by which the camera 13 is closely aligned with the face of each person X who is to be granted access to the secure area, regardless of how tall or how short that person is. This feature is illustrated schematically in FIG. 3, wherein reference numeral 25a indicates the face of the person X with an average height; reference numeral 25b indicates the face of a person X with a taller height; and reference numeral 25c indicates the face of the person X with a shorter height. Due to this alignment, the correlation between the stored image and the image from the camera for each person X is increased, and consequently recognition errors are decreased.

Figure 3:
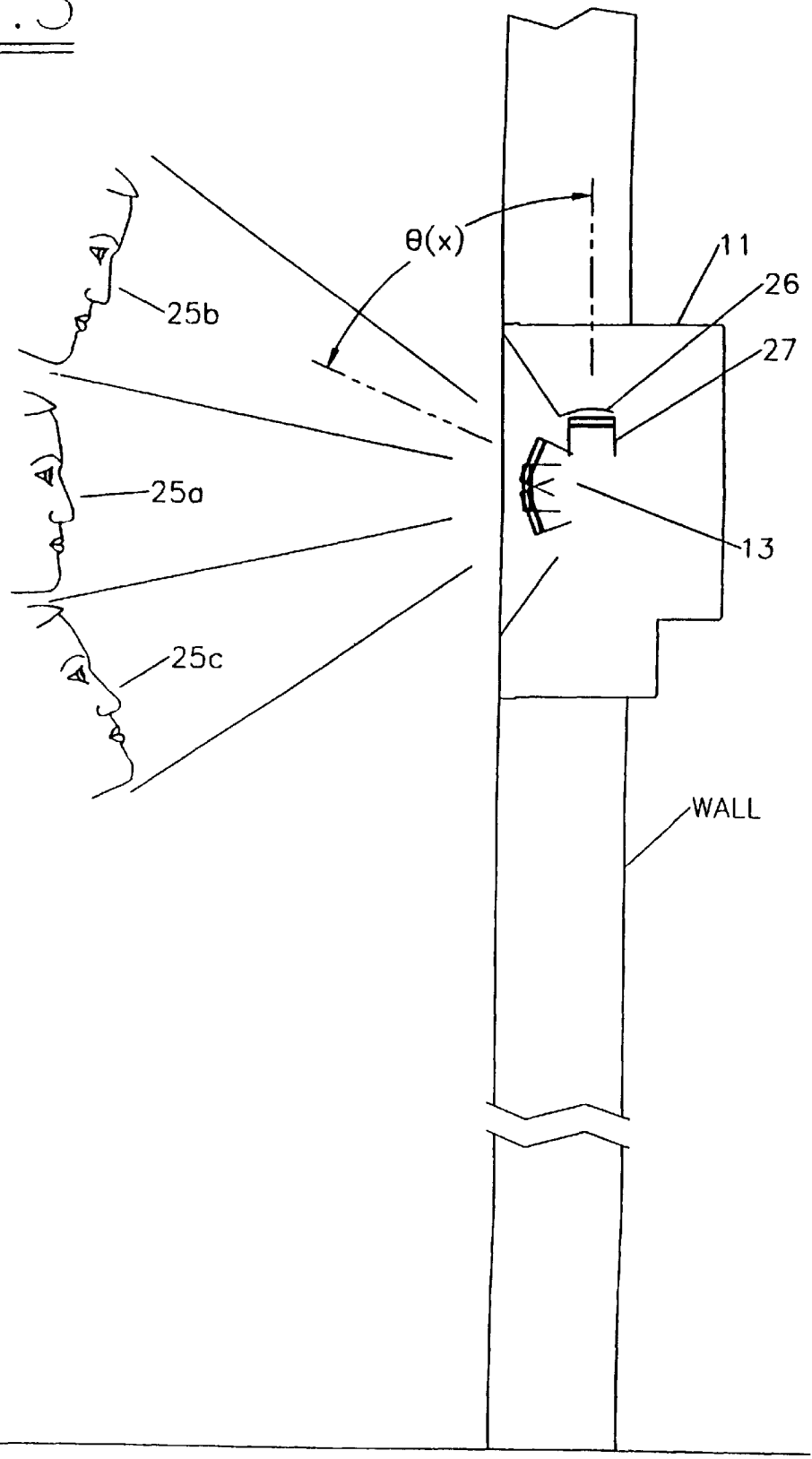
FIG. 3 shows how the object recognition system of FIG. 1 aligns the lens of a camera with the face of the person who is to be recognized, regardless of how tall or short the person is.

Another feature of the apparatus 10 is that when nobody is being enrolled or seeking access to the secure area, the apparatus 10 automatically moves the camera 13 on the carrier 14 such that the camera lens points at a surface 26 of uniform temperature which is inside of the housing 11. This position of the camera lens is indicated in FIG. 3 by reference numeral 27. By pointing the camera lens at this internal surface 26, the lens is protected from damage even though it is not provided with a cover; and, the uniform temperature of the surface 26 enables the camera to be calibrated.

Figure 4:
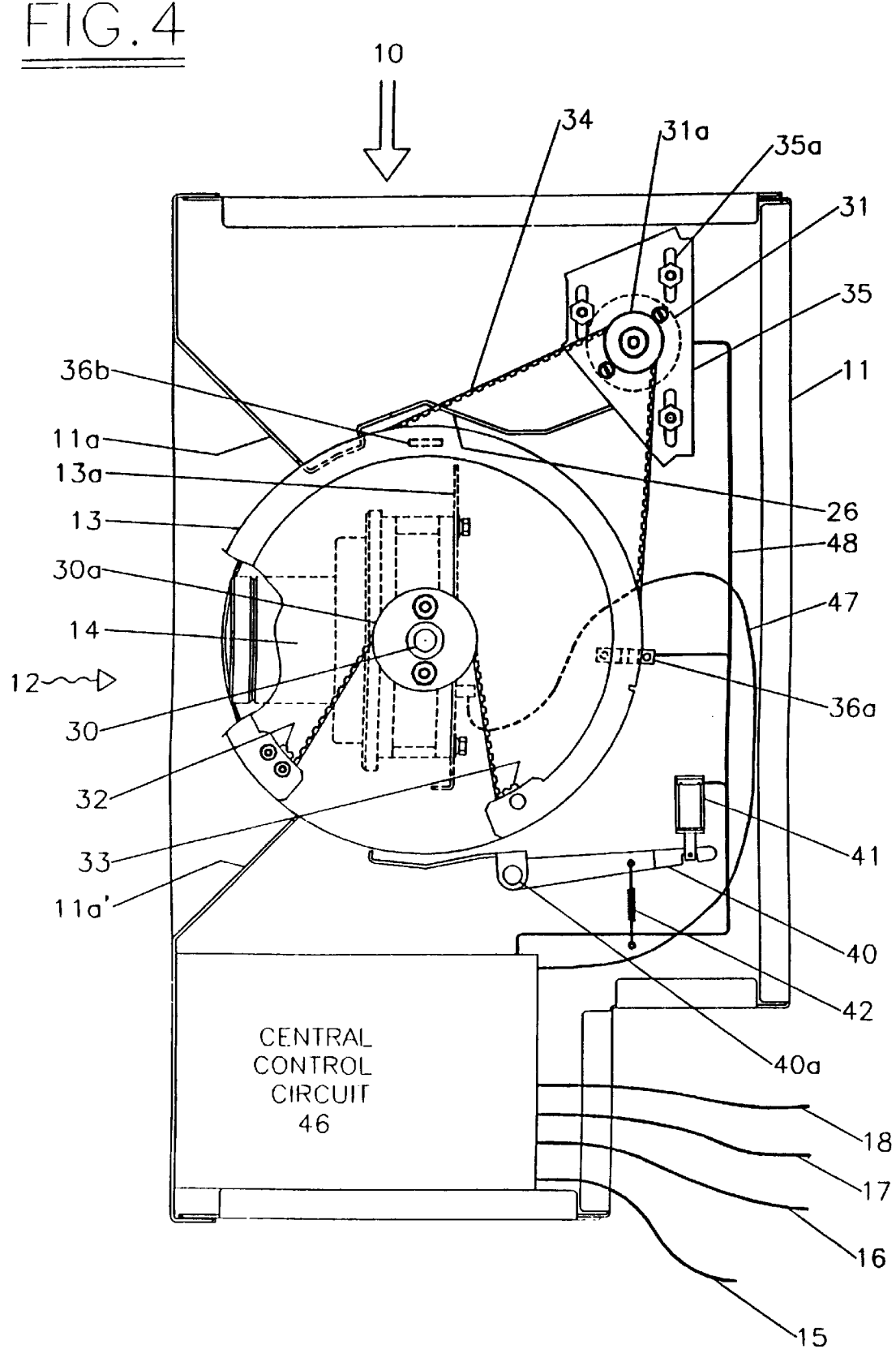
FIG. 4 is a sectional view taken along lines A—A through an apparatus in the FIG. 1 system which contains and positions the camera.
Figure 5:
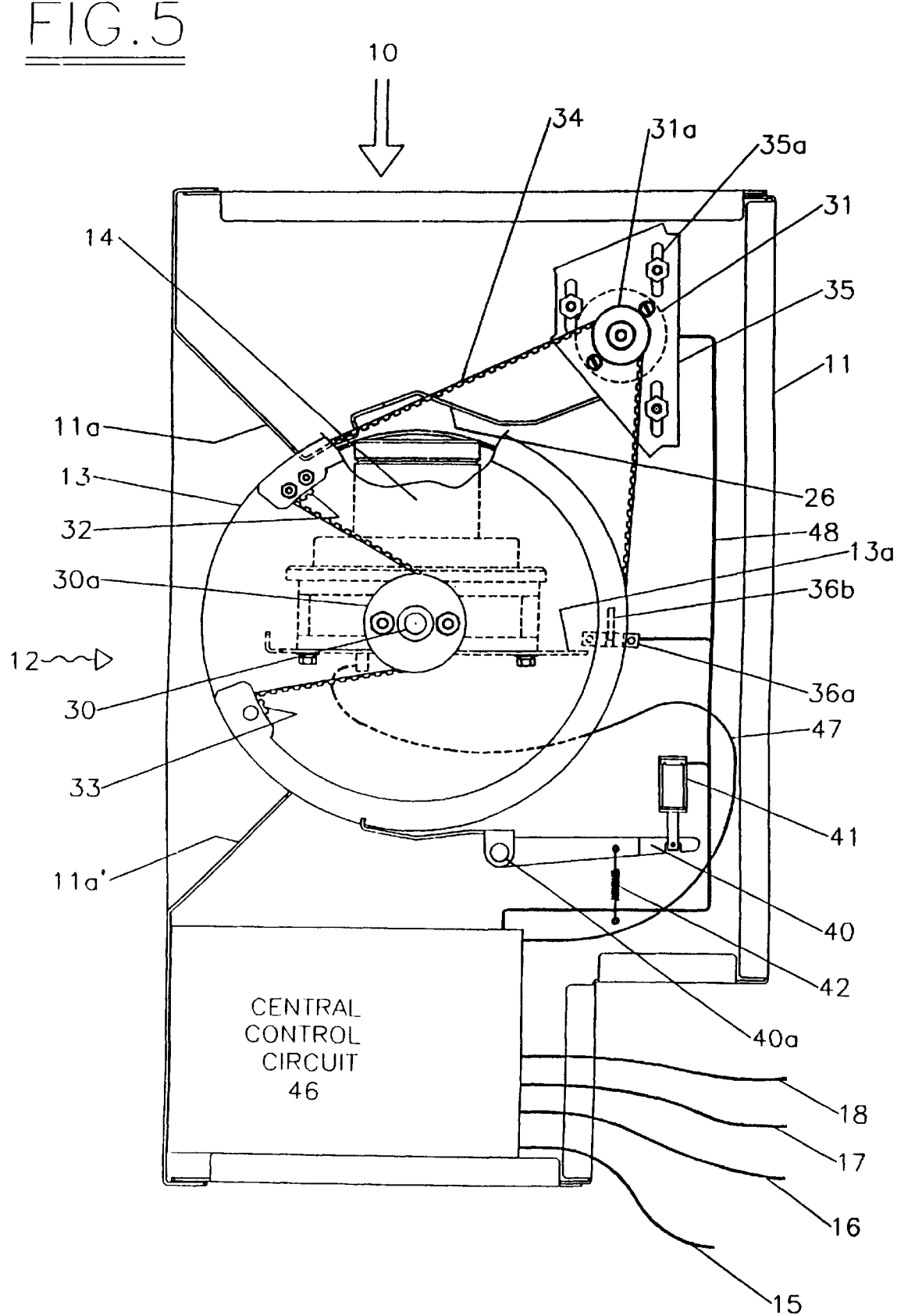
FIG. 5 is a sectional view, similar to that of FIG. 4, but which shows the camera in a different position in comparison to FIG. 4.

Turning now to FIGS. 4 and 5, the details of the internal make-up of the apparatus 10 will be described. This apparatus 10 is comprised of several components; and each of those components is identified and described below in Table 1.

TABLE 1

| COMPONENT | DESCRIPTION |
| --- | --- |
| 11 . . . | Component 11 is the housing of the apparatus 10. An opening between portions 11a and 11a' on the front face of this housing forms the window 12 for the camera 14. |
| 13 . . . | Component 13 is the carrier of the camera 14, and this carrier 13 has a hollow cylindrical shape. The camera 14 is held inside of the hollow cylinder by a bracket 13a; and the camera lens points through an opening in the cylinder sidewall of the carrier. |
| 14 . . . | Component 14 is an infrared camera which is held and rotated by the carrier 13. In FIG. 4, the camera 14 is in a position where the lens points out of the window 12 of the housing 11. In FIG. 5, the camera 14 is in a position where the lens points at the calibrating surface 26 inside of the housing 11. |
| 15 . . . | Component 15 is the cable which supplies electrical power to the apparatus 10. |
| 16 . . . | Component 16 is the cable which connects the card reader 22 to the apparatus 10. |
| 17 . . . | Component 17 is the cable which carries electrical signals that unlock the door 20 to the secure area. |
| 18 . . . | Component 18 is the cable which provides the communication channel between the apparatus 10 and the enrollment terminal 19. |
| 19 . . . | Component 19 (shown only in FIG. 1) is the enrollment terminal; and it is comprised of a personal computer with a keyboard 19a and a monitor 19b and a mouse 19c. |
| 26 . . . | Component 26 is a metal sheet. This sheet has a high thermal conductivity, which gives it a uniform temperature; and that enables the infrared camera 14 to be calibrated. |
| 30 . . . | Component 30 is an axle on which the carrier 13 rotates. This axle 30 is held at its ends by the housing 11. |
| 30a . . . | Component 30a is a smooth pulley on the axle 30. |
| 31 . . . | Component 31 is a servo motor which rotates the camera 14 on the carrier 13. |
| 31a . . . | Component 31a is a toothed pulley on the rotating shaft of the motor 31. |
| 32 . . . | Component 32 is a toothed pulley which is attached to the carrier 13 such that it is not free to rotate about its axis. |
| 33 . . . | Component 33 is a toothed pulley which is attached to the carrier 13 such that it is free to rotate about its axis. |
| 34 . . . | Component 34 is a drive belt which couples the motor 30 to the carrier 13. This belt 33 has teeth on one side and is smooth on the other side, as shown. |
| 35 . . . | Component 35 is a bracket which is attached to the housing 11 and which holds the motor 32. This bracket 35 has three slots 35a which enable the tension in the drive belt 34 to be adjusted. |
| 36a . . . | Component 36a is one portion of a home position sensor that includes a light emitting diode and a spaced-apart photocell which are held in fixed positions near the carrier 13 by the housing 11. The LED emits a light beam to the photocell which generates an electrical signal whenever the light beam is blocked. |
| 36b . . . | Component 36b is another portion of the home position sensor that includes a plate which is rotated by the carrier 13. When the carrier 13 is in the home position, the plate blocks the light beam to the photocell. |
| . . . 40 . . . | Component 40 is a lever which pivots on an axis 40a. |
| 41 . . . | Component 41 is a solenoid which holds the lever 40 in an up position if power is received on the cable 15. When the lever 40 is up, the carrier 13 is free to be driven on the axle 30 by the motor 31. |
| 42 . . . | Component 42 is a spring which holds the lever 40 in a down position if power is not received on the cable 15. When the lever 40 is down, the carrier is prevented from rotating on the axle 30. |

TABLE 1-continued

| COMPONENT | DESCRIPTION |
| --- | --- |
| 46 . . . | Component 46 is a central control circuit for the apparatus 10 which includes a microprocessor chip and a memory. This circuit coordinates the interaction between the camera 14, the enrollment terminal 19, the card reader 22, and the motor 31 by performing all of the steps of FIGS. 6A and 6B. |
| 47 . . . | Component 47 is a cable which carries electrical signals between the camera 14 and control circuit 46. |
| 48 . . . | Component 48 is a cable which carries electrical signals between the control circuit 46 and the motor 31, the home position sensor 36a, and the solenoid 41. |

One mechanical feature of the apparatus 10 in FIGS. 4 and 5 is that the drive belt 34 does not encircle the axle 30 of the carrier 13. Instead, as FIGS. 4 and 5 show, the side of the drive belt 34 with teeth contacts the pulleys 31a, 32, and 33; and the side of the drive belt 34 without teeth contacts the pulley 30a on the axle 30. Due to this feature, the drive belt 34 can be removed and replaced without having to detach the ends of the axle 30 from the housing 11.

When the apparatus 10 of FIGS. 4 and 5 is operating, the belt 34 will not fall off of the axle 30 because the carrier 13 is limited in its movement. At one limit, the carrier 13 points the camera 14 out the window parallel to the enclosure wall 11a'; and at the other limit, the carrier 13 points the camera 14 inside the housing 11 at the surface 26 as shown in FIG. 5. If electrical power is turned off while the carrier 13 is pointing the camera at the surface 26, the spring 42 will move the lever 40 to the down position and prevent the carrier 13 from moving.

Another mechanical feature of the apparatus 10 is that the belt 34 will not slip. This is because the teeth in the belt 34 mesh with the teeth in the motor pulley 31a and the carrier pulley 32. Since no slippage occurs, the angular position of the camera 14 on the carrier 13 can be determined by the control circuit 46 from signals that it receives on cable 48 which indicate the angular position of the shaft of the motor 31 relative to the home position.

Still another mechanical feature of the apparatus 10 is that when the camera 14 is pointing at the calibrating surface 26 as shown in FIG. 5, the cylindrical sidewall of the carrier 13 completely blocks the window in the enclosure 11. Consequently, the lens of the camera 14 is protected from damage, and the entire camera is protected from theft.

Figure 6A:
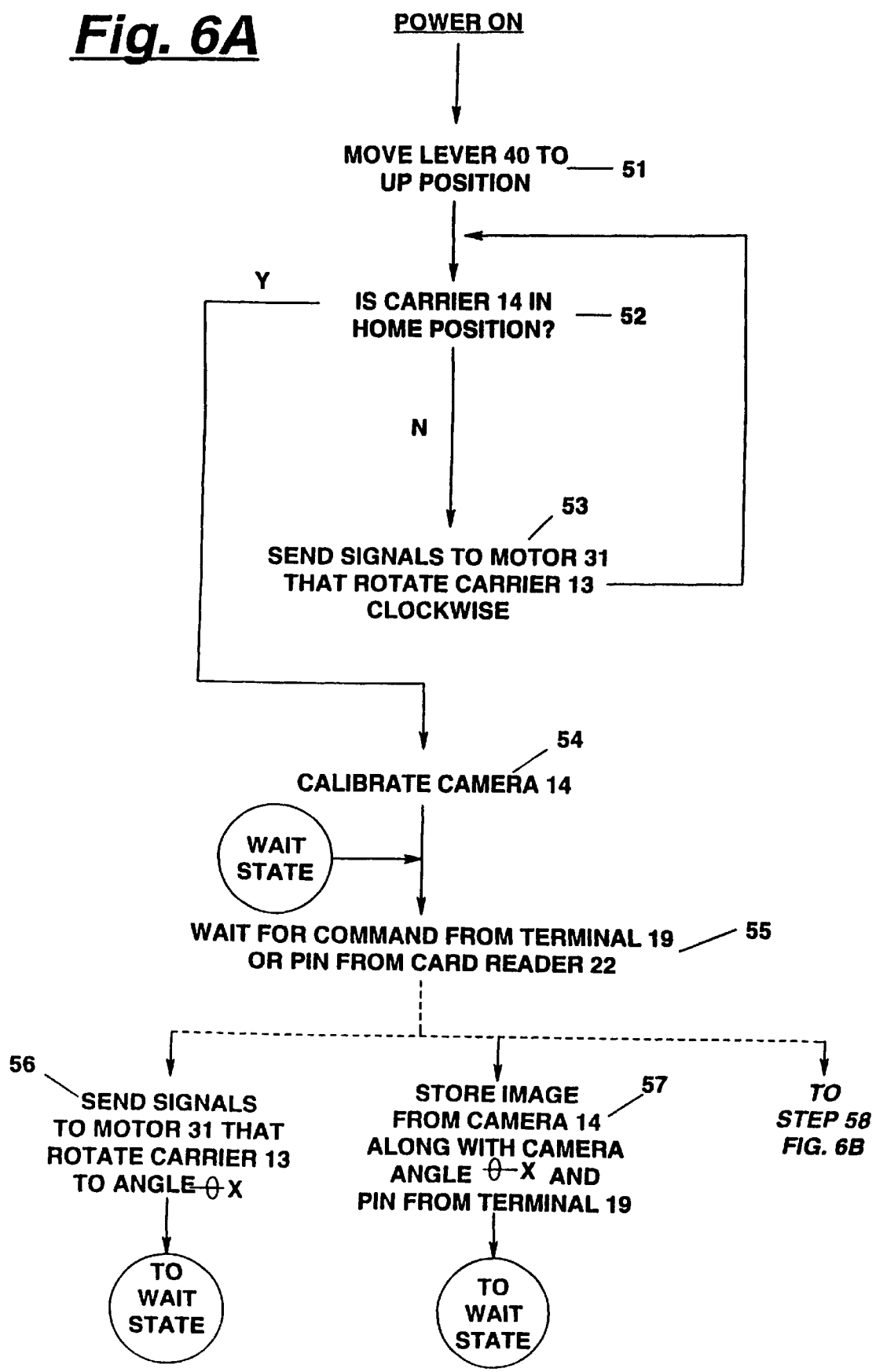
FIGS. 6A and 6B show several steps which are performed by the apparatus of FIGS. 4 and 5.
Figure 6B:
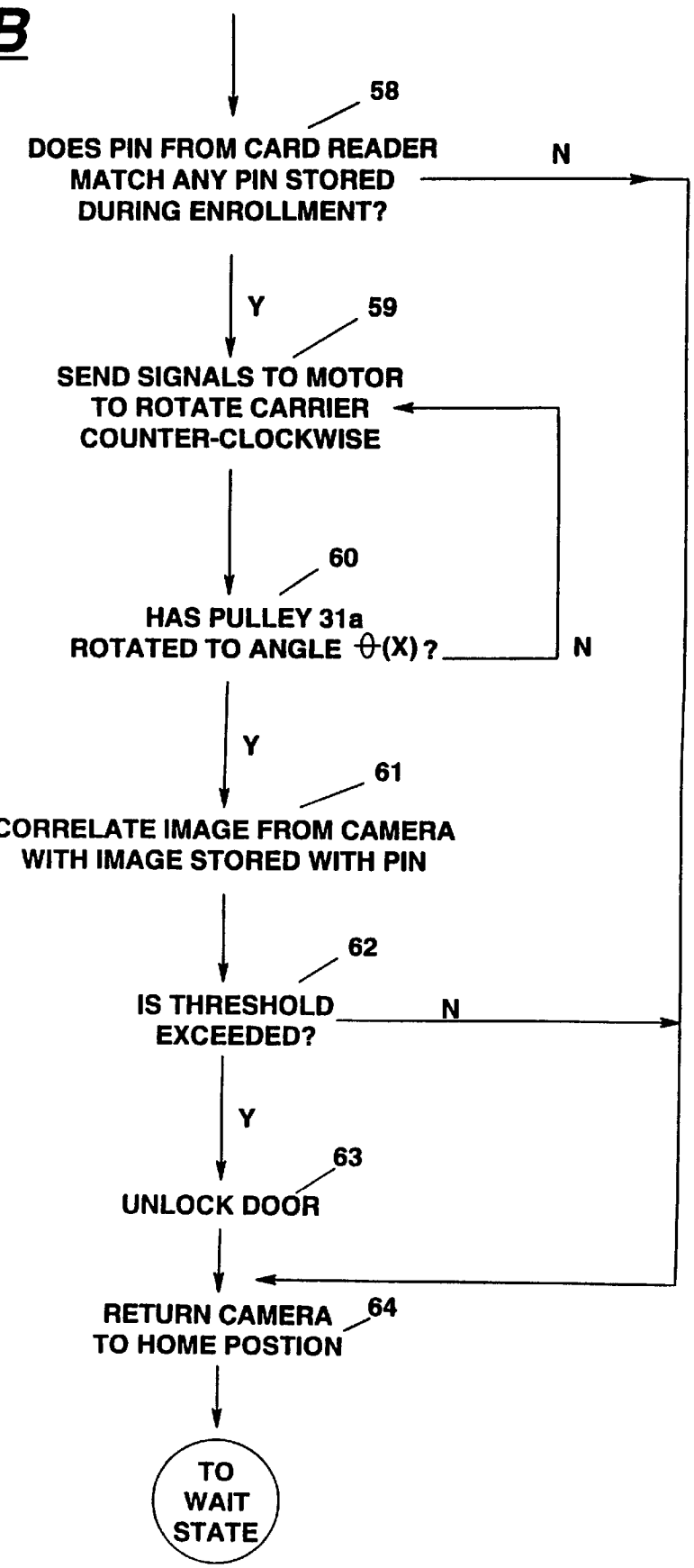

Turning now to FIGS. 6A and 6B, several steps which the control circuit 46 performs will be described. When power is initially turned on, the control circuit 46 sends a signal to the solenoid 41 which moves the lever 40 to the up position. This is indicated by step 51. Then, in step 52, the control circuit examines the signal from the sensor 36a to determine if the carrier 13 is in the home position. If the carrier is not in the home position, the control circuit 46 sends signals in step 53 to the motor 31 which cause it to rotate in the clockwise direction. Steps 52 and 53 are repeated until the carrier 13 reaches the home position.

When the carrier 13 is in the home position, the lens of the camera 14 is pointing at surface 26 inside of the housing 11. Surface 26 is at a uniform temperature, and that enables the calibrating step 54 to be performed. In this calibration, an image of the surface 26 from the camera 14 is stored in the control circuit 46. This image is comprised of hundreds of pixels; and ideally, each pixel should have the same magnitude, since the surface 26 is at a uniform temperature. If, however, any variation occurs between the pixel values, then that variation can be compensated for by remembering what the variation is and subtracting it out when an image of a person is subsequently taken. For example, if a particular pixel in the calibrating step has a magnitude of twenty when its magnitude should be thirty, then the value of that pixel will be increased in the control circuit 46 by ten every time it receives an image of a person from the camera 14.

Following the above steps, the control circuit 46 enters a wait state which is indicated by reference numeral 55. There, the control circuit waits to receive a command from the enrollment terminal 19 or receive a personal identification number from the card reader 22.

If the control circuit 46 receives a command from the enrollment terminal 19 to rotate the carrier 13 to a particular angle θ(X), then the control circuit 46 performs step 56. There, the control circuit 46 sends signals to the motor 31 which cause the carrier 13 to rotate to the specified angle θ(X). To perform this step, the control circuit 46 receives feedback signals from the motor 31 which indicate the angle of the motor pulley 31a.

If the control circuit 46 receives a command from the enrollment terminal 19 to enroll a person X, then the control circuit 46 performs step 57. There, the control circuit 46 stores an image of the person X from the camera 14. With that image, the control circuit 46 also stores a personal identification number which it receives from the enrollment terminal 19, and the angle θ(X) at which the camera 14 is pointing.

If the control circuit 46 receives a personal identification number from the card reader 22, then the control circuit 46 performs the steps which are shown in FIG. 6B. First, in step 58, the control circuit 46 compares the personal identification number from the card reader 22 to the personal identification numbers which it previously stored from the terminal 19 during step 57. If a match is not found, then the control circuit 46 denies the person access to the secure area by taking the no branch "N" to step 64. There, the control circuit 46 sends signals to the motor 31 which returns the camera 14 to the home position, and then a branch is taken back to the "wait" state of step 55.

Conversely, if a match is found during step 58, then steps 59 and 60 are performed. By these steps, the control circuit 46 sends signals to the motor 31 which rotate the carrier 13 to the angle θ(x) which corresponds to the matching personal identification number.

When the carrier 13 reaches the angle θ(X), the control circuit 46 performs step 61. There, the control circuit 46 receives an image from the camera 14 of the person who is seeking access to the secure area, and it correlates that image with the image which it has stored with the matching personal identification number. Then, the result of the correlation is compared with a predetermined threshold as indicated by step 62.

If the threshold is not exceeded, the control circuit 46 denies the person access to the secure area by taking the no branch "N" to step 64. Conversely, if the threshold is exceeded, the control circuit 46 grants the person access to the secure area by taking the yes branch "Y" to step 63. There, the control circuit 46 generates a signal on the cable 17 which unlocks the door 20 to the secure area. Then the control circuit 46 returns the camera 14 to the home position, and branches back to the "wait state" of step 55.

One preferred embodiment of the present invention has now been described in detail. However, as one modification, the objects which are recognized by the FIG. 1 system are not limited to a person's face. Instead, the FIG. 1 system can be used to recognize any type of object. For example, the FIG. 1 system can be used to recognize various components which in turn, are selected or rejected by a robotic arm.

As another modification, the camera 14 which is included in the FIG. 1 system is not limited to an infrared camera. Instead, the camera 14 can be any type of camera such as one which obtains images of an object in the visible or the ultraviolet light spectrum.

Also in the FIG. 1 system, the window 12 in the housing 11 is an uncovered opening. But as a modification, that opening can be replaced with a planar transparent member. However, an uncovered opening is preferred because it will not distort the camera image and will not accumulate dirt.

Accordingly, the present invention is not to be limited to the illustrated preferred embodiment, but is defined by the appended claims.

What is claimed is:

1. An object recognition system which is comprised of:
   an infrared camera that has a lens which is uncovered;
   a housing which encloses said camera, has a window for said lens, and has an internal calibrating surface which has a uniform temperature;
   a rotating means, which is inside of said housing and which carries said camera, for receiving electronic control signals and rotating said camera at selectable angles in response thereto;
   a control means for generating said electronic control signals such that said rotating means points said camera lens -a) through said window at said object; and b) inside of said housing at said calibrating surface; and,
   a compensation circuit which subtracts variations in an image by said camera of said calibrating surface from an image by said camera of said object.

2. A system according to claim 1 wherein said control means includes a memory which correlates each object that is to be recognized with a particular one of said selectable angles.

3. A system according to claim 2 wherein each object that is to be recognized is a human face at a different height relative to said window, and each angle in said memory points said camera directly at the corresponding face.

4. A system according to claim 1 wherein said rotating means blocks said window when said camera is pointed inside of said housing.

5. A system according to claim 1 wherein said rotating means is rotated on an axle by a belt which forms a closed loop that does not encircle said axle.

6. A system according to claim 5 wherein said belt has a first surface which is coupled to said rotating means at two spaced-apart locations, and has a second surface opposite said first surface which is coupled to said axle between said spaced-apart locations.

7. A system according to claim 6 wherein said rotating means has fixed teeth at a single one of said two spaced-apart locations, and said first surface of said belt has teeth which mesh with said fixed teeth on said rotating means.

8. A system according to claim 1 and further including a latch means which stops said rotating means from rotating if said lens is pointing inside of said housing and said control means is not receiving electrical power.

9. A system according to claim 1 wherein said control means senses when said camera lens is pointing in one predetermined direction, and measures said selectable angles relative to that one direction.

10. A system according to claim 1 wherein said window is an uncovered opening in said housing.

11. A system according to claim 1 wherein said window is a planar transparent member.

12. An object recognition system which is comprised of:
    an infrared camera that has a lens which is uncovered;
    a housing which encloses said camera, has a window for said lens, and has an internal surface for calibrating said camera;
    a rotating means, which is inside of said housing and which carries said camera, for receiving electronic control signals and rotating said camera at selectable angles in response thereto;
    a control means for generating said electronic control signals such that said rotating means points said camera lens -a) through said window at any one of said selectable angles, and b) inside of said housing to protect said lens; and,
    said rotating means being rotated on an axle by a belt which forms a closed loop that does not encircle said axle.

13. A system according to claim 12 wherein said camera generates images of said objects in the infrared frequency spectrum.

14. A system according to claim 12 wherein said camera generates images of said objects in the visible frequency spectrum.

* * * * *

UNITED STATES PATENT AND TRADEMARK OFFICE
CERTIFICATE OF CORRECTION

PATENT NO. : 6,097,029
DATED : August 1, 2000
INVENTOR(S) : Downie et al.

It is certified that error appears in the above-identified patent and that said Letters Patent is hereby corrected as shown below:

Title page, Please add Item [73], Assignee: Unisys Corporation, Blue Bell, PA

Signed and Sealed this

Twenty-second Day of May, 2001

Attest:

NICHOLAS P. GODICI

Attesting Officer     Acting Director of the United States Patent and Trademark Office